United States Patent

[11] 3,619,504

[72] Inventors John A. De Veer
Olney;
Howard H. Nick, Potomac, both of Md.
[21] Appl. No. 887,965
[22] Filed Dec. 24, 1969
[45] Patented Nov. 9, 1971
[73] Assignee International Business Machines Corporation
Armonk, N.Y.

[54] DIRECTIONAL NONRETURN TO ZERO COMPUTER BUSSING SYSTEM
6 Claims, 10 Drawing Figs.

[52] U.S. Cl. .... 178/68, 178/58, 178/70, 333/10
[51] Int. Cl. .... H04b 1/58
[50] Field of Search .... 340/147 R, 147 CV, 147 CN; 178/58, 58.1, 59, 60, 61, 67, 68, 50, 70; 333/6, 8, 10, 24; 325/51, 52, 53, 54, 308, 26, 15

[56] References Cited

UNITED STATES PATENTS

| | | | |
|---|---|---|---|
| 3,516,065 | 6/1970 | Bolt et al. | 340/170 |
| 3,238,299 | 3/1966 | Lender | 178/68 |
| 3,500,252 | 3/1970 | Wakker | 333/8 |
| 3,537,036 | 10/1970 | Winegard et al. | 333/10 |
| 3,435,415 | 3/1969 | Chur | 340/163 |
| 3,497,619 | 2/1970 | Babcock | 178/68 |

*Primary Examiner*—Benedict V. Safourek
*Attorney*—Hanifin and Jancin

ABSTRACT: A high-speed data transmission network employing data representations as changes in voltage along a transmission line. Directional coupling elements are spaced along the transmission line to couple information from the transmission line to stub lines. Each stub line is connected to a receiver circuit designed to interpret pulses on the stub line as one binary state and no pulses on the stub line as a second binary state.

INVENTORS
JOHN A. de VEER
HOWARD H. NICK

BY John D. Crane
AGENT

DIRECTIONAL NONRETURN TO ZERO COMPUTER BUSSING SYSTEM

BACKGROUND OF THE INVENTION

This invention relates broadly to data communications and, more specifically, to data communications within a digital computer system.

In the normal digital computer system, it is a commonplace requirement to transmit data from one physical location within the system to another, for example between a magnetic core storage unit and a central processing unit. In the typical digital computer system that has already become quite commonplace, the circuitry employed for the transmission of information between two system elements has been heretofore rather simple. In the past, a typical data communications network would include a data register which is connected by logical elements and wires to special driver circuits for placing the information contained within the data register upon a transmission line bussing network. The transmission lines constitute physical wiring connections such as coaxial cables between the two elements in communication. The receiving element has appropriate receiver circuits designed to interpret the voltage at the receiving end of the transmission line as a data bit.

Typically, the communication over such data busses has been of the interlocking type. Interlocking communications require that the sending element of the system hold the data upon the data buss until such time as the receiving element in the system can acknowledge the receipt of the data on a different transmission line. Such a data communication system by necessity is time consuming and thus does not lend itself to extremely high speed digital computer systems.

As the speed of computation within central processing units of computer systems has increased, the desirability of producing high speed data transmission networks within computers has increased. One approach to increasing the speed of data transmission lines within computer systems is suggested by Murray H. Bolt et al. in their patent application of Ser. No. 609,083, which was filed Jan. 13, 1967, and having the same assignee as this patent application. Among other things, it was suggested by Bolt et al. that data transmission busses within computer systems could be of the dynamic type. That is, the interlocking communications on the data buss are no longer required because the data is represented by a pulse traveling down the transmission line which is detected by a receiver in the receiving system element.

Specifically, the Bolt et al. system employed the use of driver circuits which caused a voltage transition to propagate down a transmission line. A coupling element longitudinally positioned on the transmission line converted the changing voltage into a pulse which itself propagated down a stub transmission line to the receiver circuit. Because of the nature of the system, the receiver was required to detect and interpret pairs of pulses sensed on the stub transmission lines. Typically, a binary state being transmitted would be represented by a positive pulse followed by a negative pulse on the stub lines.

Such a data bussing network for computers has certain advantages over the interlocking data bussing network, however, this network is limited in the speed at which it can operate. The speed of operation is limited by the fact that each data bit must be represented by two pulses traveling along the stub lines. Thus, the speed at which circuits can be turned on and off becomes critical as far as data rates along the transmission lines are concerned.

It is therefore a first object of this invention to provide a higher speed data bussing network for digital computers than heretofore available.

It is a further object of this invention to provide a high-speed data communications network for digital computers which employs simple and low-cost circuitry which will provide greater communications distances than the networks of the past and being smaller and less expensive.

BRIEF DESCRIPTION OF THE INVENTION

In order to achieve the above-identified and other objects, the present data bussing system employs a driver circuit which responds to system data representations so as to transmit a change of voltage along the transmission line whenever one binary state is to be transmitted, and fails to transmit a change in voltage along the transmission line when a second binary state is to be transmitted. Directional coupling elements are positioned longitudinally along the transmission line. These directional coupling elements couple the data being transmitted along the transmission line to stub lines which are connected to receiver circuits. Because of the nature of the directional coupler and the data representations of the transmission line, the receiver circuits must be designed to respond to positive or negative pulses so as to represent one binary state encountered on the stub line and to respond to no pulses in the other binary state.

The foregoing and other objects, features and advantages of the invention will be apparent from the following more particular description and preferred embodiments of the invention as illustrated in the accompanying drawings.

IN THE DRAWINGS

FIGS. 3*a*, 3*b*, 3*c*, and 3*d* describe diagrammatically the construction and operation of the tricoupling element.

Figures 3A, 3B, 3C, 3D, 4A, 4B:
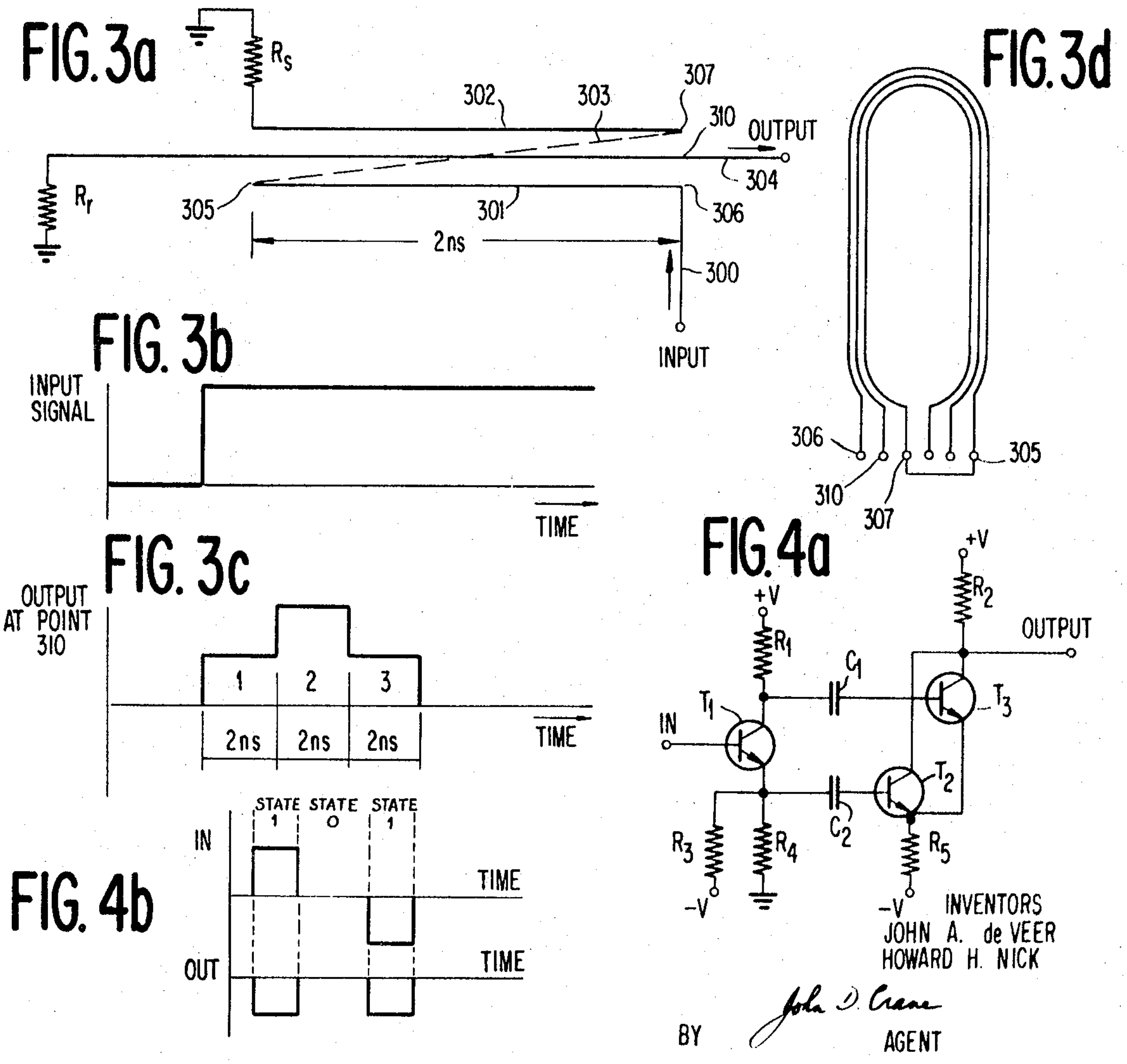

FIGS. 4*a* and 4*b* show the circuitry in operation of a typical receiver required by the present bussing system.

Figure 5:
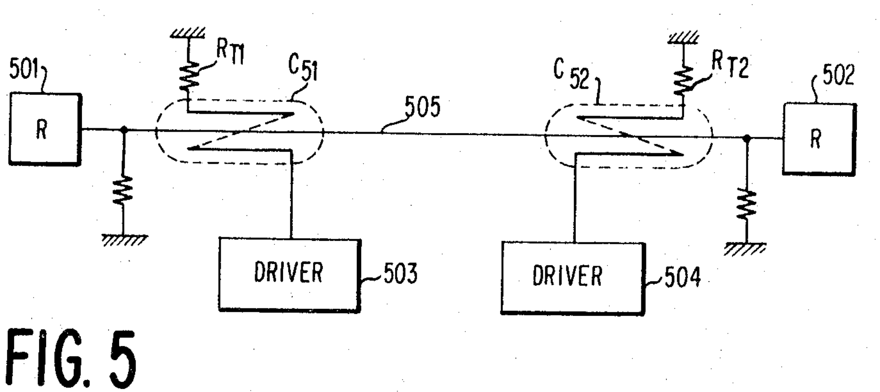

FIG. 5 shows a duplex system having two receivers and drivers communicating on one transmission line.

Figure 6:
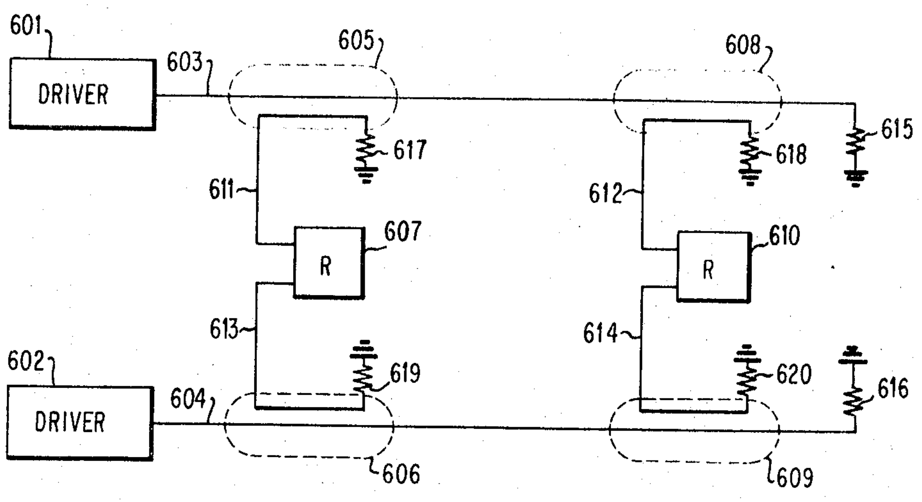

FIG. 6 shows a dual multiplex system where signals can be transmitted from two drivers to two receivers.

DETAILED DESCRIPTION

Figure 1:
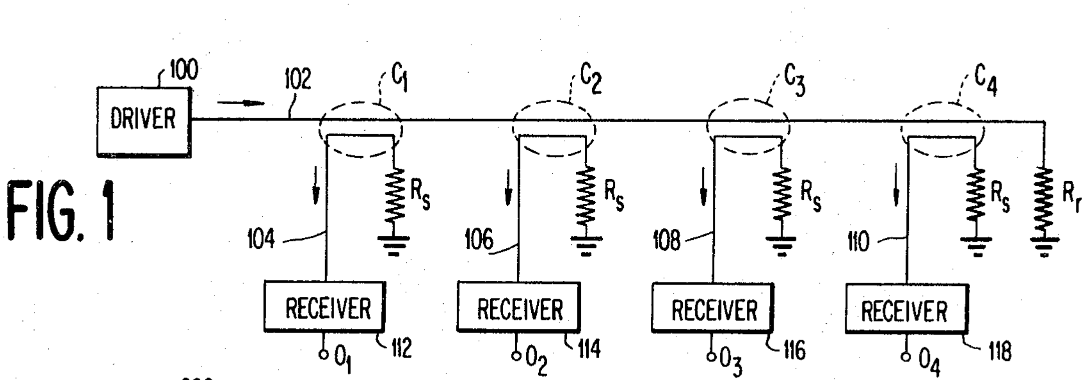
FIG. 1 shows a bussing system characterized by this invention having a single driver and a plurality of receivers.

Referring now to FIG. 1, a typical configuration of a data bussing system for use within digital computers is shown. Driver 100 is shown connected to transmission line 102. Driver 100 is physically located within the chassis of an element within the digital computer system. Transmission line 102 is normally a cable extending between the element having the driver and some other terminating point shown as $R_T$. The terminating element $R_T$ is normally a resistor, typically having the characteristic impedance of the transmission line 102.

Spaced longitudinally along the transmission line 102 are several directional coupling elements $C_1$, $C_2$, $C_3$ and $C_4$. These elements can be of the type shown by Bolt et al. or a tricoupling element. The nature of the tricoupling elements will be described in greater detail later and may also be found in copending application entitled "Strip Line Directional Coupling Device." Between the directional coupling elements and the receiver circuits 112, 114, 116 and 118, there are several stub transmission lines 104, 106, 108 and 110. Also connected to the directional coupling elements are terminating resistors labeled $R_s$ and these resistors typically have the characteristic impedance of the stub transmission lines.

The operation of the system shown within FIG. 1 is relatively simple. The driver 100 places a ramp voltage change upon transmission line 102. This voltage change propagates down transmission line 102 to the terminating resistor $R_T$. As the transitioning voltage passes through each of the directional coupling elements $C_1$, $C_2$, $C_3$ and $C_4$, a voltage pulse is coupled onto one of the stub transmission lines. A voltage pulse emanating from driver 100 in the direction of the arrow, will cause an induced voltage pulse to occur in any one of the stub transmission lines in the direction of the arrow shown relating thereto. Thus, a transitioning voltage sent by driver 100 will cause a pulse to be transmitted down each of the stub lines towards its associated receiver. Each of the receiver circuits 112, 114, 116 and 118 are constructed so as to respond to the pulse and place on its associated output a level representative of the binary value transmitted between driver 100 and the receiving receiver circuit.

In order to achieve high-speed data transmission on a data bussing system like that shown in FIG. 1, the data representation becomes critical. In the above-mentioned system described by Bolt et al., data representations upon the transmission line, such as transmission line 102, would be a voltage transitioning from a first state to a second state followed by a return transition back to the first state. Thus, data would be represented by a pulse along the transmission line. The present system, however, employs a vastly different technique. The present system requires that one possible binary state be transmitted along transmission line 102 as a change in the voltage on transmission line 102, i.e., one binary state is represented along transmission line 102 as a change in voltage rather than a pulse. Such a data representation scheme has often been referred to as NRZ encoding. Such encoding eliminates the requirement of sensing two transitions down the transmission line and thus, for the same circuit family, has the potential of doubling the data rate contained on a given transmission line.

Figure 2:
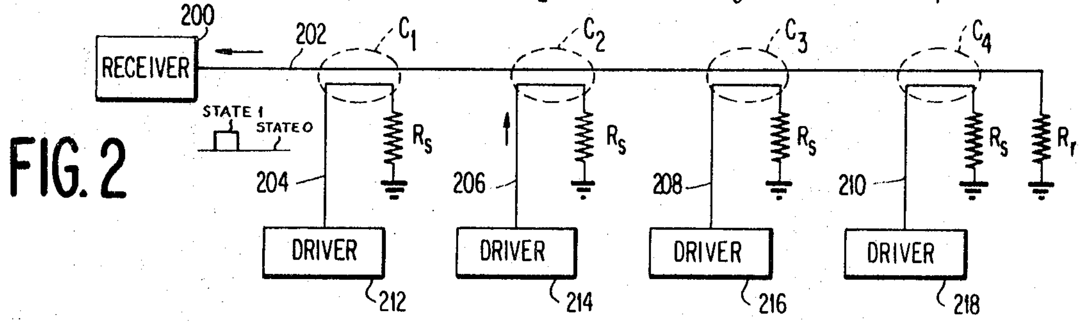
FIG. 2 shows a data bussing system characterizing this invention having a plurality of drivers and a single receiver.

A second system configuration characterizing the present invention is shown in FIG. 2. This system might typically be employed where a plurality of central processing units are connected to a single shared high-speed magnetic core storage unit. In such a system, the ability for each of the central processing units to send commands to the high-speed magnetic core storage unit is required. In order to accomplish this result using the present invention, a plurality of driver circuits are required. A driver circuit is required for each data bit line between, for example, the central processing unit and the magnetic core storage unit. This is shown figuratively in FIG. 2 by drivers 212, 214, 216 and 218. Each of these drivers is connected to a single stub transmission line 204, 206, 208 and 210. The stub transmission lines connect a given driver to a directional coupling element which is longitudinally positioned along transmission line 202. The directional coupling elements are shown as $C_1$, $C_2$, $C_3$ and $C_4$, Each of the stub transmission lines after passing through the associated directional coupler is terminated in a terminating resistor labeled $R_s$, which is of the magnitude of the characteristic impedance of the stub transmission lines. The transmission line 202 is also terminated by a terminating resistor labeled $R_t$. The other end of transmission line 202 is connected to receiver circuit 200. The characteristics of data representations from driver circuits 212, 214, 216 and 218 are the same as for driver 100 shown in FIG. 1. Also, receiver circuit 200 in FIG. 2 has the same characteristics as does receiver circuits 112, 114, 116 and 118 in FIG. 1.

To describe the operation of the system shown in FIG. 2, a transitioning voltage is assumed to occur on stub transmission line 206 which is caused by driver circuit 214. The transitioning voltage propagates along stub transmission line 206 in the direction of the arrow and eventually reaches the terminating resistor $R_s$. As the transitioning voltage passes through directional coupler $C_2$, a voltage pulse is induced in transmission line 202 which travels in the direction toward receiver 200. As the pulse on transmission line 202 passes through directional coupler $C_1$, a voltage is induced in stub line 204. Because of the directional characteristics of the directional coupling element, the induced voltage in stub line 204 is moving in a direction toward the terminating resistor $R_s$ and does not propagate down the stub transmission line to the driver circuit 212. After passing through directional coupler $C_1$, the data pulse on transmission line 202 simply propagates along the transmission line until it reaches receiver circuit 200. Receiver circuit 200 then acts so as to output a given binary state when a data pulse is detected on transmission line 202 than outputs a second binary state when no data pulse is detected upon transmission line 202. Such a receiver is like that of receiver 112, 114, 116 and 118 in FIG. 1.

Another critical element for enhancing the speed at which a data transmission network can operate is the tricoupling element itself which can be substituted for the directional coupler described in the Bolt et al. application. A brief description of the tricoupling element will be contained herein, however, the reader is referred to copending application entitled "Strip Line Directional Coupling Device."

Briefly, the tricoupler will be described in relation to FIGS. 3a, 3b, 3c and 3d. FIG. 3a shows diagrammatically the nature of the tricoupling element itself. Line 300 is representative of the stub transmission line connecting to, for example, a driver circuit of the type shown in FIG. 2. Line 301 forms an integral part of the tricoupling element and is positioned in close proximity to transmission line 304, such that a voltage pulse traveling down line 301 will be coupled onto line 304.

Through the use of a unique physical design, the tricoupling element has a second coupling line 302 which is also in close proximity to transmission line 304. Coupling line 302 is connected to coupling line 301 by dotted line 303 which represents a very short jumper wire between the end of the coupling line 301 which is labeled 305 and the end of coupling line 302 which is labeled 307. Point 307 on the end of coupling line 302 is physically located adjacent to transmission line 304 and opposite point 306 on coupling line 301. Coupling line 302 from point 307 is parallel to the transmission line 304, running the same distance parallel to transmission line 304 as does coupling line 301. Coupling line 302 is then terminated in a resistor $R_s$ which is of a magnitude equal to the characteristic impedance on the stub transmission line. The transmission line 304 is also terminated in a characteristic impedance shown as $R_T$. A possible physical configuration for the tricoupling element is shown in FIG. 3d, the end points shown there are the same points shown in FIG. 3a.

In order to understand the operation of the tricoupling element, reference is now made to FIG. 3b. The signal shown graphically in FIG. 3b is the input signal which is traveling down the stub transmission line 300 shown in FIG. 3a. This signal would ideally be a step function. The input signal enters coupling line 301 at point 306. It is assumed for the sake of this discussion that the propagation delay along coupling line 301 is 2 nanoseconds. During the first 2-nanosecond period in which the input pulse is propagating down coupling line 301, a voltage is coupled onto the transmission line 304 and the output voltage is shown diagrammatically in FIG. 3c for the point 310. During the first 2-nanosecond period (region 1 under the curve in FIG. 3c), a voltage is coupled onto transmission line 304 due to the propagation of the pulse down coupling line 301.

Because of the directional characteristics of a coupler of this type, a voltage step function entering coupling line 301 at point 306 and propagating in the direction of the terminating impedance $R_s$ will cause a voltage pulse to be induced in the transmission line 304 which is traveling in the direction away from the terminating resistor $R_T$.

During the second 2-nanosecond period, the input signal traverses coupling line 302 which passes along the same path of transmission line 304 as did the pulse when it was traversing coupling line 301. Consequently, during the second 2-nanosecond period, a voltage twice as high as was coupled during the first 2-nanosecond period is detected at point 310 on transmission line 304. This is shown diagrammatically in FIG. 3c in region 2 under the curve. During the third 2-nanosecond time period, only one voltage contribution is encountered at point 310 on transmission line 304 and this is shown diagrammatically in FIG. 3c by region 3 under the curve.

The advantages of such a tricoupler as has been described are quite clear. In the first place, a coupling element of this type can be made smaller than conventional directional coupling devices and still have the same peak output voltage. In the second place, for a given length of coupling line, it is possible to obtain a voltage twice as high as those in standard directional coupling elements. These advantages are important because they mean that larger signals can be propagated down the transmission line towards the receiver than was heretofore known through the use of directional coupling elements. As a result, coupled signals can be transmitted longer distances and arrive at a receiver input with the same magnitude as was possible in prior art devices traveling over a shorter distance.

Because of the characteristics of the directional coupling elements and because of the data definition on the bussing system of the present invention, positive or negative pulses are present on lines leading to receiver elements in the present bussing system. These positive and negative pulses are representative of one binary state while the lack of pulses are representative of a second binary state being transmitted in the data transmission network. It is, therefore, necessary to construct a receiver circuit which will respond to either positive or negative pulses in one binary state and fail to respond to the lack of pulses and to represent the second binary state.

A circuit is shown in FIG. 4*a* which will accomplish the above described objectives for a receiver circuit. FIG. 4*b* shows typical input and output signals for the circuit in FIG. 4*a*.

Transistor $T_1$ is biased into a conducting region. When a positive pulse is present at the input, transistor $T_1$ tends to conduct more, thus causing the voltage across resistor $R_4$ to increase. A positive pulse is coupled through coupling capacitor $C_2$ to the base of transistor $T_2$. A positive pulse appearing at the base of transistor $T_2$ will cause that transistor to conduct and thus drive the voltage at the output point negative. Removal of the pulse will return all transistors to their steady state biased operating point.

A negative pulse present at the input or base of transistor $T_1$ will cause transistor $T_1$ to conduct less current and thus the collector $T_1$ will increase in voltage. A voltage pulse will be coupled through coupling capacitor $C_1$ to the base of transistor $T_3$. A positive pulse being received at the base of $T_3$ will cause $T_3$ to conduct and thus lowering the voltage at the output point.

The operation of the circuit shown in FIG. 4*a* will consequently convert either positive or negative input pulses into negative output pulses while the lack of a pulse at the input will cause no change in the output.

The driver elements shown in FIGS. 1 and 2 are well known in the prior art and need little description. Typically, a driver which is required to generate an NRZ signal comprises the following elements: a flip-flop circuit for counting the occurrences of a given binary state and an output driver for driving signals on a transmission line, the signals being representative of the output state of the flip-flop. Other possible configurations for the driver circuit of FIGS. 1 and 2 for generating NRZ codes may be found in numerous patents and articles directed toward digital magnetic recording where NRZ type codes are frequently used.

FIG. 5 shows a duplex system employing two drivers and two receiver circuits having the capability of transmitting signals in two directions simultaneously down a transmission line. Driver circuits 503 and 504 are connected to directional couplers $C_{51}$ and $C_{52}$. The directional couplers shown in this example are tricoupler elements.

A signal of the type shown in FIG. 3*b* being transmitted by driver 504 to coupler $C_{52}$ and terminating at terminating resistor $R_{T2}$ will cause a signal like that shown in FIG. 3*c* to be coupled onto transmission line 505. This coupled signal on transmission line 505 will propagate along the transmission line in a direction towards receiver 501. Similarly, if a signal such as that shown in FIG. 3*b* is transmitted by driver 503 to directional coupler $C_{51}$ and terminated at terminating resistor $R_{T1}$, a signal like that shown in FIG. 3*c* will propagate down transmission line towards receiver 502.

Because of the directional characteristics of the tricoupling element shown in FIG. 5, it is possible to have signals traveling along the transmission line in opposite directions and have no interference at the receivers because of the simultaneous transmission.

FIG. 6 shows a dual multiplex system for interconnecting two driver circuits with two receiver circuits. Driver elements 601 and 602 are respectively connected to transmission lines 603 and 604. Spaced along transmission line 606 are two directional couplers 605 and 608. Transmission line 603 is terminated by terminating resistor 615 which has the characteristic impedance equal to that of transmission line 603. Stub line 611 is connected between receiver circuit 607 and directional coupler 605 and is ultimately terminated in terminating resistor 617. Receiver circuit 607 is also connected to stub line 613 which interconnects with coupler 606 and is terminated at terminating resistor 619. Thus, receiver 607 is capable of receiving signals originating from either driver 601 or driver 602.

Receiver 610 is also capable of receiving signals from drivers 601 and 602. This capability is facilitated by coupler 608 and 609 which couples signals from transmission lines 603 and 604, respectively, onto either stub line 612 or 614. Stub lines 612 and 614 are terminated at receiver 610.

The receivers and transmitters in FIG. 6 should have the receiving and driving characteristics outline earlier in this application.

The circuitry in FIG. 6 has been explained for one possible use. However, it is possible to save circuitry by making certain modifications. By changing the physical packaging of the network, directional coupler 605 and 606 can be placed in close physical proximity. Such close proximity would make the use of two stub lines costly. The stub lines 611 and 613 should be considered as the same stub line connected to a receiver 607 and to two directional couplers 605 and 606. The same considerations can apply equally to directional couplers 608 and 609, stub lines 612 and 614, and to receiver 610. A system having such a structure must operate in such a way, however, so as to prevent the simultaneous operation of two drivers.

While the concept of FIG. 6 is portrayed as having two drivers and two receivers, it will be recognized that more drivers could be added along with an accompanying increase in directional couplers and transmission lines. It is also clear that the system can be modified to have any number of receiver circuits.

While the invention has been particularly shown and described with reference to preferred embodiments thereof, it will be understood by those skilled in the art that the foregoing and other changes of form and details may be made therein without departing from the spirit and scope of this invention.

What is claimed is:

1. A high-speed data transmission network comprising:
 a driver means having an output for placing data upon a transmission line wherein one binary state is transmitted by a change in the driver output and a second binary state is transmitted by no change in the driver output;
 a transmission line connected to the output of said driver means;
 at least one directional coupler located longitudinally along said transmission line, each directional coupler having an output stub upon which data is coupled from said transmission line to said stub; and
 a receiver circuit for each stub, each receiver circuit having an output and each connected to a single stub and responsive to either positive or negative pulses on said stub to output one binary state and to output the other binary state in response to no pulses on said stub.

2. The high-speed data transmission network of claim 1 wherein said directional couplers are tricouplers.

3. A high-speed data transmission network comprising:
 at least one stub line;
 a driver means for each stub line and having an output connected to one stub line, said driver means for placing data upon a stub line wherein one binary state is transmitted by a change in the driver output and a second binary state is transmitted by no change in the driver output;
 a transmission line;
 a directional coupler connected to each stub line and spaced along said transmission line, each directional coupler for coupling data from a connected stub line to said transmission line; and at least one receiver circuit connected to said transmission line, each receiver circuit having an output representing two binary states, said receiver circuit responding to positive and negative pulses on said transmission line to output one binary state and responding to no pulses on said transmission line to output a second binary state.

4. The high-speed data transmission network of claim 3 wherein said directional couplers are tricouplers.

5. A high-speed data transmission network comprising:

N driver means, where N is a positive integer greater than 1, each having an output for placing data upon a transmission line wherein one binary state is transmitted by a change in the driver output and the other binary state transmitted by no change in the driver output;

N transmission lines, each transmission line connected to the output of one driver means;

P directional couplers, where P is a positive integer, and where each coupler is spaced along each of said transmission lines, each directional coupler having an output to which signals are coupled from said transmission line;

P stub means, each connected to the output of N directional couplers, each directional coupler connected to said stub means being spaced along a different transmission line; and P receiver circuits, each connected to one stub means and each receiver having an output, said receiver responsive to either positive or negative pulses on the connected stub means to output one binary state and responsive to no pulses on the connected stub means to output the other binary state.

6. The high-speed data transmission network of claim 5 wherein said directional couplers are tricouplers.